Sept. 15, 1942.  A. WEINGARTEN  2,296,128
THERMOSTATICALLY CONTROLLED MIXING FAUCET
Filed March 17, 1941  2 Sheets-Sheet 1
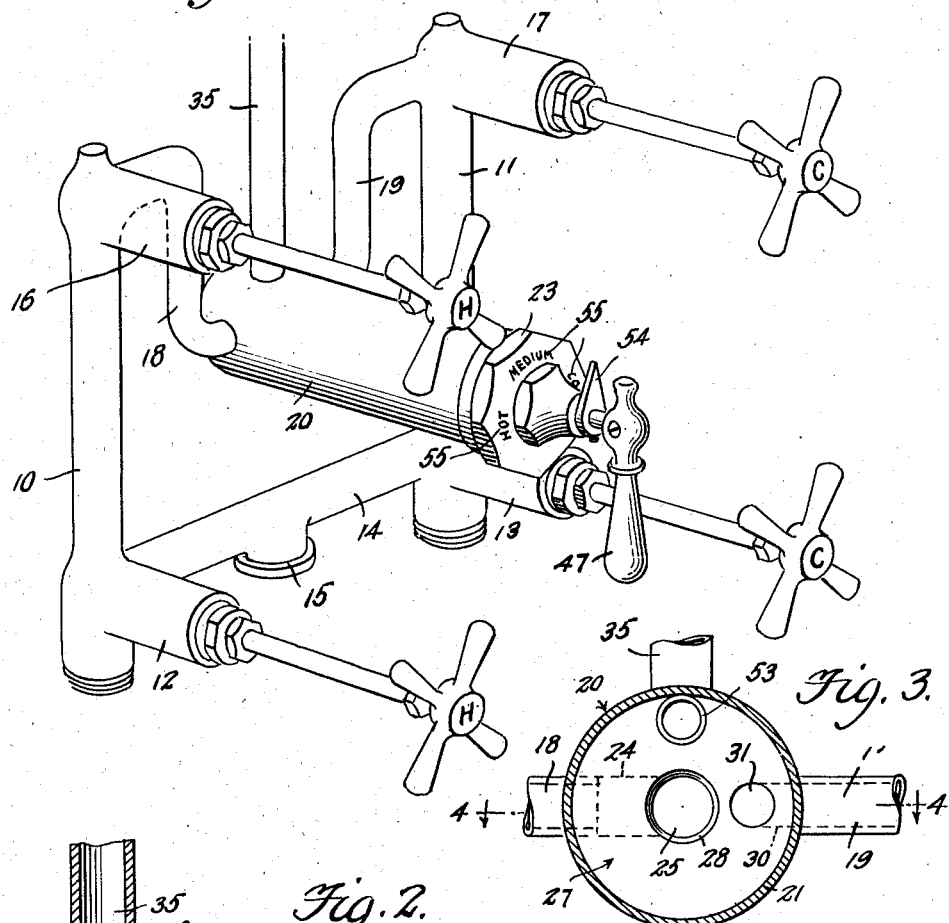
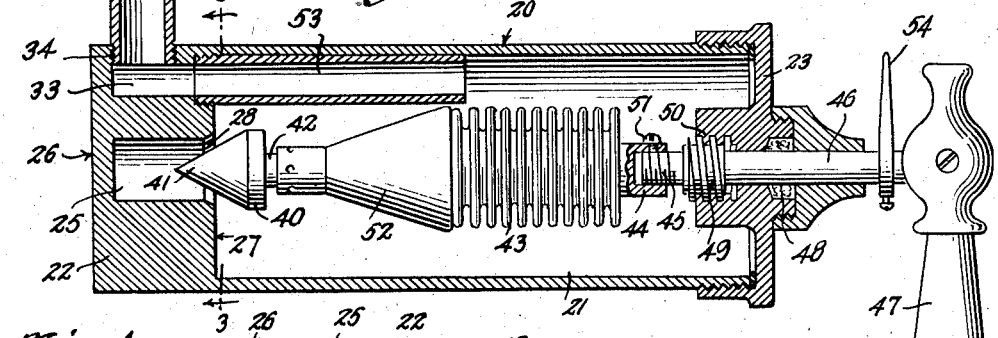
INVENTOR.
ABRAHAM WEINGARTEN
BY Clark & Ott
ATTORNEYS Sept. 15, 1942.  A. WEINGARTEN  2,296,128
THERMOSTATICALLY CONTROLLED MIXING FAUCET
Filed March 17, 1941  2 Sheets-Sheet 2
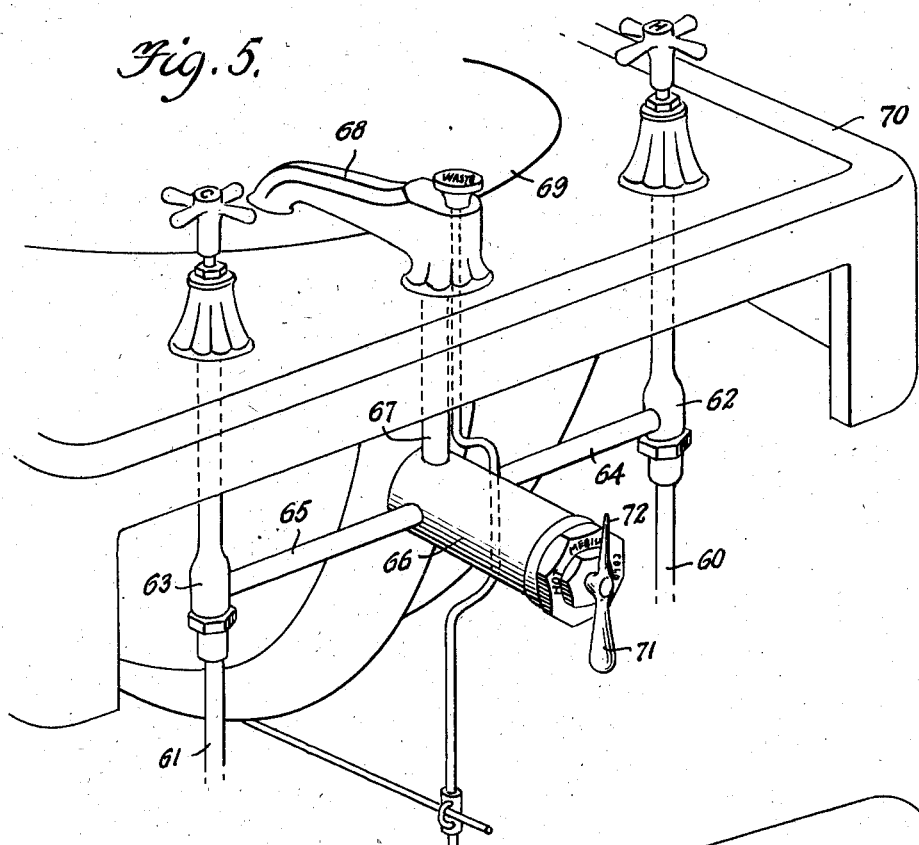
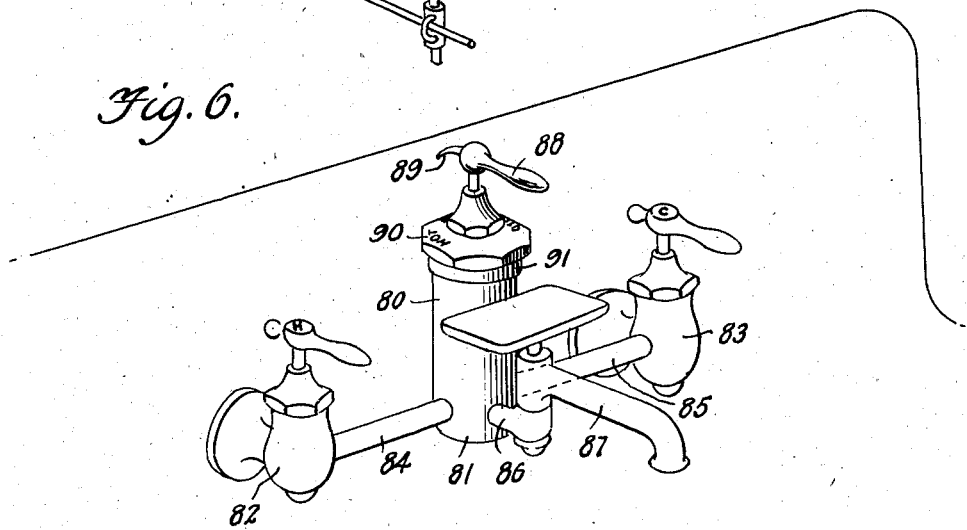
INVENTOR.
ABRAHAM WEINGARTEN
BY
Clark & Ott
ATTORNEYS Patented Sept. 15, 1942

2,296,128

UNITED STATES PATENT OFFICE 2,296,128

THERMOSTATICALLY CONTROLLED MIXING FAUCET

Abraham Weingarten, Bronx, N. Y.

Application March 17, 1941, Serial No. 383,781

1 Claim. (Cl. 236—12)

This invention relates to plumbing fixtures and refers more particularly to an improved device for regulating the temperature of the water supplied to shower bath heads and to the faucets of lavatories, bathtubs, sinks and the like.

Plumbing fixtures such as shower bath heads and mixing faucets for lavatories, bathtubs and sinks which are supplied with mixtures of hot and cold water and which are provided with no means for automatically regulating the temperature of the mixed water, have caused serious injuries due to scalding as a result of unregulated hot water flowing from the fixtures.

The present invention broadly aims to eliminate this hazard by providing an improved thermostatically actuated device which functions to automatically shut off or regulate the flow of the hot water to thereby preclude the emission from the fixture outlet of water exceeding a safe temperature.

More particularly the invention resides in an improved thermostatically actuated device of the indicated character which embodies means which is so constructed and arranged as to permit of manual setting of the device to vary the maximum temperature of the water flowing from the device.

With these and other objects in view, the invention is set forth in greater detail in the following specification and illustrated in the accompanying drawings in which:

Fig. 1 is a perspective view of a bathtub and shower combination fixture equipped with a device constructed in accordance with the invention for automatically regulating the temperature of the water supplied to the shower head.

Fig. 2 is an enlarged longitudinal vertical sectional view through the temperature regulating device.

Fig. 3 is a transverse vertical sectional view thereof taken approximately on the line 3—3 of Fig. 2.

Fig. 4 is a fragmentary transverse horizontal sectional view taken approximately on the line 4—4 of Fig. 3.

Fig. 5 is a fragmentary perspective view of a lavatory mixing faucet equipped with a thermostatically actuated device constructed in accordance with the invention.

Fig. 6 is a fragmentary perspective view of a sink mixing faucet equipped with a thermostatically actuated device constructed in accordance with the invention.

Referring to the drawings by characters of reference and particularly to the form of the invention illustrated in Figs. 1, 2, 3 and 4, 10 and 11 designate respectively the hot and cold water pipe sections of a bathtub and shower combination fixture which communicate at their lower ends with the hot and cold water supply of a plumbing system.

As illustrated, lower valves 12 and 13 are provided for respectively controlling the supply of hot and cold water to a transverse mixing pipe 14 having an outlet 15 to which the bathtub faucet is attached. The pipes 10 and 11 are provided with upper valves 16 and 17 for controlling the supply of hot and cold water to feed pipes 18 and 19 which lead to the automatic water temperature regulating device, designated generally by the reference character 20. The device 20, in this instance, consists of a horizontally disposed tubular or hollow cylindrical body 21 having a head 22 at the rear end thereof and a removable cap 23 at the forward end defining within the structure a mixing chamber.

The hot water feed pipe 18 is connected with a radial inwardly extending inlet opening 24 formed in the head and communicating with an axially extending bore 25 spaced from the outer rear surface 26 of the head and opening through the forward or inner surface 27 thereof to define a rearwardly tapered valve seat 28. The cold water feed pipe 19 is connected with a radially extending inlet opening 30 having a forwardly directed lead 31 opening through the forward or inner face 27 of the head 22 and spaced from and alongside of the axial bore 25. The head 22 is also provided with an outlet bore 33 which opens through the forward surface 27 of the head and extends rearwardly and is spaced from the rear surface 26 thereof with a radial outwardly directed threaded bore 34 extending from the bore 33 and opening through the periphery of the head 22 for receiving an upwardly directed pipe 35 for conveying water to a shower head.

Under this construction and arrangement, it is obvious that by opening the valves 16 and 17 hot and cold water will be admitted to the mixing chamber and the mixed water conveyed therefrom through the outlet 33 and pipe 35 to the shower head.

In order to cut off and automatically control the admission of hot water to the mixing chamber from the hot water feed pipe 18, a valve element 40 is provided which is formed with a conical rear terminal 41 adapted to cooperate with the valve seat 28 of the axial bore 25 of the head 22. The stem 42 of the valve element 40 extends forwardly and is connected with a bellows type thermostat 43, the forward end of which is provided with an internally threaded tubular boss 44 connected to the threaded rear end 45 of an actuating shaft 46 which extends forwardly through the cap 23 and is secured at its protruding outer end to a manipulating handle 47.

A suitable stuffing box 48 on the cap surrounds the shaft section to prevent leakage and the shaft section is provided with an enlarged threaded shoulder 49 intermediate the ends thereof cooperating with the internally threaded boss 50 on the cap 23. The threaded rear terminal 45 of the shaft section is locked against turning movement in the boss 44 by a set screw 51. The valve stem 42 between the valve element 40 and the rear end of the thermostat 43 is covered by a rearwardly tapering frusto-conical shield 52. The outlet bore 33 is provided with a forwardly extending tube 53 which terminates at its forward end in the region of the thermostat 43. The exposed portion of the shaft section 46 is provided with a radial pointer 54 and the forward face of the cap 23 is provided with circumferentially spaced indicia 55.

In use and operation, the valve element 40 is normally set with the conical rear terminal 41 protruding through the valve seat 28 and partially into the axial bore 25 so that the surface of the conical terminal is spaced from the valve seat to admit hot water into the mixing chamber defined within the hollow cylindrical body 21. If the heat of the water exceeds a predetermined temperature which is considered safe for bathing, the temperature will effect a longitudinal expansion of the thermostat 43 thereby engaging the conical rear terminal of the valve with the valve seat 28 to cut off the hot water before a sufficient quantity has been admitted to the mixing chamber to pass therefrom and be emitted from the shower head. By providing the outlet 33 with the extension tube 53 any possible by-passing of the hot water supply from the inlet 25 to the outlet 33 before it acts upon the thermostat is avoided. If the hot water admitted to the mixing chamber exceeds the predetermined safe temperature, the bather of necessity must open the cold water valve 17 to admit cold water to the mixing chamber for tempering the hot water and lower the temperature thereof which will effect a longitudinal contraction of the thermostat 43 to open the valve element 40 with reference to the inlet 25. The thermostat and valve element 40 may be manually adjusted by the bather towards or away from the valve seat 28 by means of the manipulating handle 47 to vary the volume of hot water admitted to the mixing chamber independent of the opening of the valve 16. In order to gage this, the indicia 55 such as the words "Hot," "Medium" and "Cold" is inscribed on the forward face of the cap 23 and the positioning of the pointer 54 with reference to said indicia will indicate the setting of the valve and thermostat for this purpose.

In practice, if the shaft section 46 is turned counterclockwise to dispose the pointer 54 in registry with the word "Hot," the valve element and thermostat will be retracted or moved forwardly towards the cap 23 thereby requiring a greater expansion of the thermostat before the valve is seated and conversely if the shaft is rotated in a clockwise direction to register with the words "Medium" or "Cold," the thermostat is moved rearwardly and the valve element 40 nearer to the seat to require a lesser expansion of the thermostat before the valve is seated.

In the adaptation of the invention illustrated in Fig. 5 of the drawings, 60 and 61 designate respectively the hot and cold water supply pipes which are connected with manually actuated valves 62 and 63 which control the supply of water to hot and cold water feed pipes 64 and 65 leading respectively to diametrically opposite sides of the thermostatically actuated device 66 which is of identical construction to the device 20 of the previous form. In this instance, however, the upwardly directed outlet pipe 67 which corresponds to the pipe 35 of the previous form is connected with the outlet nozzle 68 for conveying water to the basin 69 of the lavatory 70.

In this adaptation of the invention the horizontally disposed tubular or hollow cylindrical body of the device 66 extends rearwardly from the lavatory and the manipulating handle 71 for setting the thermostatically controlled valve to vary the maximum temperature of the water flowing through the outlet pipe 67 is provided with a pointer terminal 72 to gage the setting of the thermostatically controlled valve within the device 66. The use and operation of the device is identical with that described for the previous use of the invention and by equipping a lavatory with the device it is obvious that the temperature of the water flowing from the outlet nozzle 68 is automatically controlled to avoid the flow of water therefrom which exceeds a safe temperature.

In the application of the invention to a sink faucet as illustrated in Fig. 6 of the drawings, the thermostatically actuated device 80 which is identical with the device 20 in the first adaptation of the invention, is installed with the tubular or hollow cylindrical body disposed vertically with the headed end 81 at the bottom. The hot and cold water supply valves 82 and 83 are connected with the headed lower end of the device 80 by hot and cold water feed pipes 84 and 85 and the outlet 86 of the device 80 communicates with the outlet nozzle 87.

In this instance, the manipulating handle 88 corresponding to the handle 47 of the previous device is located at the upper end and is provided with a pointer 89 which is registered with the indicia 90 on the cap 91 to gage the setting of the thermostatically controlled valve within the device 80.

What is claimed is:

A device of the character set forth including a tubular body defining a mixing chamber, a head at the rear end of the body having circumferentially spaced radially disposed ports respectively defining hot and cold water inlets and a mixed water outlet, said head having axially extending passages communicating with the ports respectively and opening at the forward ends thereof into the mixing chamber, the axial passage of the hot water inlet being arranged centrally of the head, a valve seat formed on the head at the forward end of the hot water passage, a removable closure cap covering the forward end of the body and a valve assembly carried by said cap and removable therewith as a unit from the tubular body, said valve assembly including a valve stem extending centrally through the cap in alignment with the hot water passage and axially adjustable with reference to the cap upon rotation thereof, an axially expansible and contractible thermostat carried by the rear end of said stem and a valve element carried by the rear end of said thermostat manually adjustable by rotation of the valve stem towards and away from the valve seat and automatically movable towards and away from the valve seat by the action of the thermostat.

ABRAHAM WEINGARTEN.